United States Patent Office 2,779,768
Patented Jan. 29, 1957

2,779,768

3-(HYDROXY LOWER ALKYL)-AMINOMETHYL-4-HYDROXYCOUMARIN COMPOUNDS

Alice Ota Robertson and Dale N. Robertson, Madison, and Karl Paul Link, Middleton, Wis., assignors to Wisconsin Alumni Research Foundation, Madison, Wis., a corporation of Wisconsin No Drawing. Application October 21, 1953,
Serial No. 387,546

5 Claims. (Cl. 260—343.2)

The present invention relates to 3-substituted-4-hydroxycoumarin compounds. More specifically the invention is directed to 4-hydroxycoumarins substituted in the 3-position by the following group:

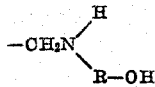

where R represents a lower alkyl group. The following examples will serve to illustrate the invention.

EXAMPLE I

*3-(α,α-dimethylethanol)-aminomethyl-4-hydroxycoumarin*

To a solution of 2.67 g. of 2-amino-2-methylpropanol-1 in 15 ml. of absolute ethanol is first added 1.62 g. of aqueous formalin (37% formaldehyde). To this solution is next added 3.72 g. of 4-hydroxycoumarin in 15 ml. of absolute ethanol. The resulting reaction mixture is warmed on a steam bath for a few minutes and then allowed to stand. The desired product which separates as a precipitate is recovered by filtration. It has a melting point of 183–186° C. (d).

EXAMPLE II

*3-(2-hydroxypropyl)-aminomethyl-4-hydroxycoumarin*

This product is prepared in accordance with Example I, by reacting 1-amino-propanol-2, formaldehyde and 4-hydroxycoumarin in equimolar amounts. It has a melting point of 192° C. (d).

EXAMPLE III

*3-(β-hydroxyethyl)-aminomethyl-4-hydroxycoumarin*

This product is prepared in accordance with the above examples by employing as the amine, ethanolamine. It has a melting point of 177° C. (d). In a similar manner other 3 - hydroxy - R - aminomethyl-4-hydroxycoumarin compounds can be prepared by use of hydroxy-R-amines, where R stands for a lower alkyl group.

EXAMPLE IV

*3-allyl-aminomethyl-4-hydroxycoumarin*

This product is prepared in accordance with the above examples by employing allylamine as the amine for reaction with the formaldehyde and 4-hydroxycoumarin. The desired product has a melting point of 150–155° C. (d) and differs from the compounds in the other examples in that it has a double bond in the R group and lacks the hydroxy group. The compounds of the invention are characterized by anticoagulant activity.

We claim:

1. A 4-hydroxycoumarin having a substituent at the 3-position represented by the following formula

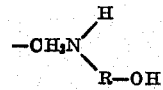

where R represents a lower alkyl group.
2. The product, 3-(α,α-dimethylethanol)-aminomethyl-4-hydroxycoumarin.
3. The product, 3-(2-hydroxypropyl)-aminomethyl-4-hydroxycoumarin.
4. The product, 3-(β-hydroxyethyl)-aminomethyl-4-hydroxycoumarin.
5. The product, 3 - allyl - aminomethyl - 4 - hydroxycoumarin.

References Cited in the file of this patent

UNITED STATES PATENTS

| | | |
|---|---|---|
| 2,600,375 | Ackermann | June 17, 1952 |
| 2,610,152 | Ackermann | Sept. 9, 1952 |
| 2,680,747 | Williams et al. | June 8, 1954 |

OTHER REFERENCES

Clinton et al.: J. A. C. S., 71, 3602–3606 (1949).
Boekelheide et al.: J. A. C. S., vol. 72, pp. 5005–5009 (1950).
Arndt et al.: Berichte, vol. 84, p. 322 (1951).